Patented Feb. 1, 1927.

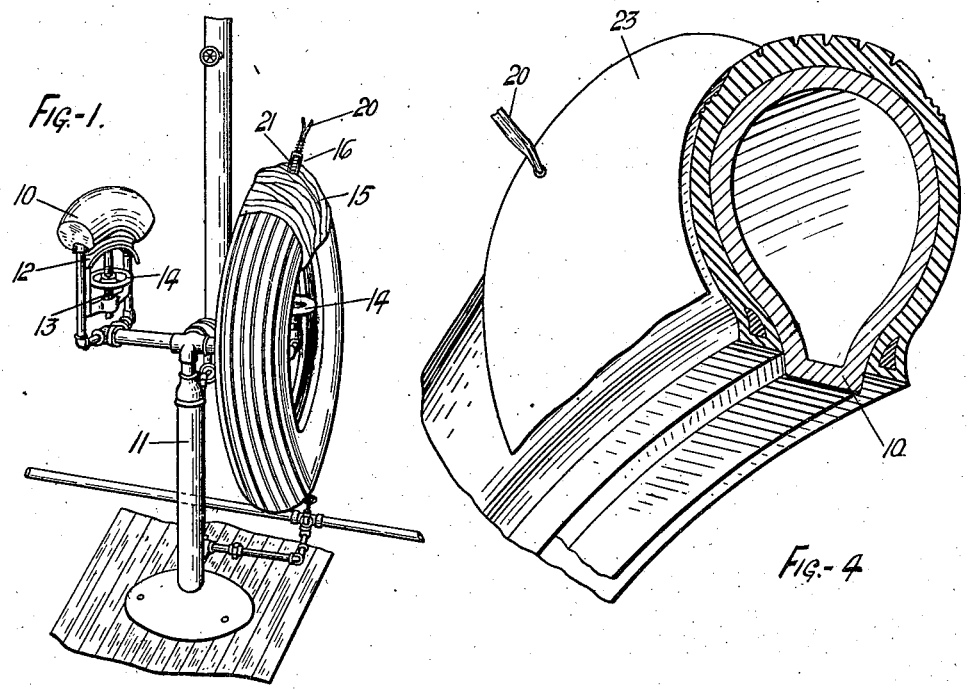
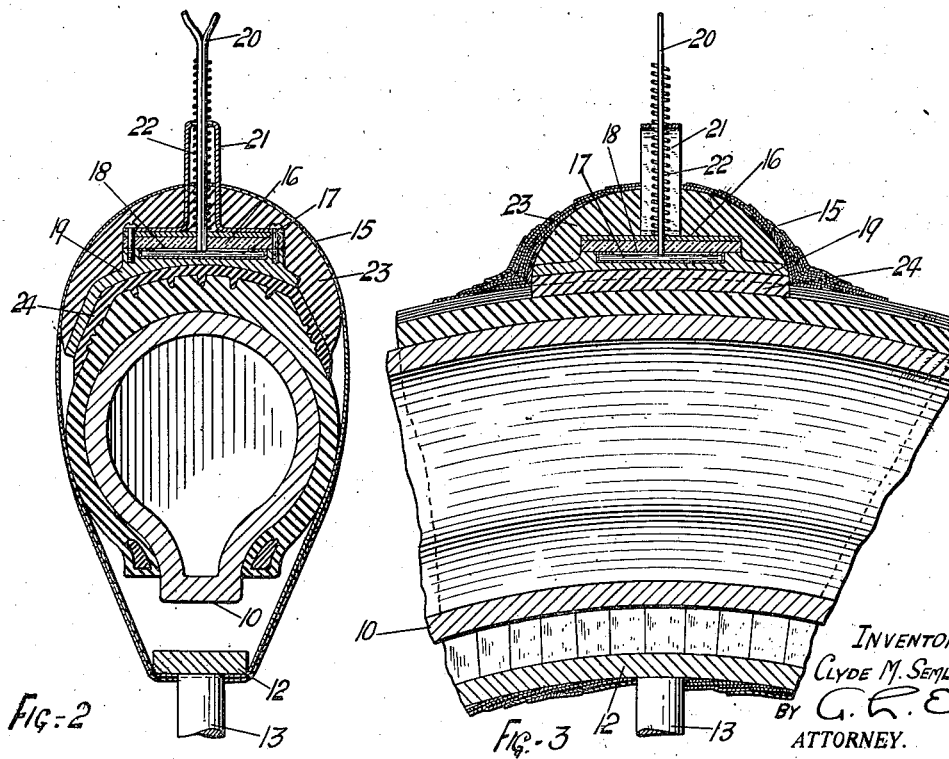

1,616,066

UNITED STATES PATENT OFFICE.

CLYDE M. SEMLER, OF AKRON, OHIO, ASSIGNOR TO THE FIRESTONE TIRE & RUBBER COMPANY, OF AKRON, OHIO.

APPARATUS FOR REPAIRING TIRES.

Application filed March 3, 1926. Serial No. 91,892.

This invention relates to apparatus for repairing pneumatic tire casings.

The general purpose of the invention is to provide improved apparatus for curing tire repairs by the "internal arm" method.

The foregoing and other objects are obtained by the method illustrated and described herein and by the apparatus disclosed in the accompanying drawings and referred to below. It is to be understood that the invention is not limited to the particular method or apparatus set forth.

Of the accompanying drawings:

Figure 1 is a perspective view illustrating apparatus embodying the invention in use for carrying out the improved method on a tread repair;

Figure 2 is a transverse section through one curing arm;

Figure 3 is a longitudinal section therethrough; and

Figure 4 is a perspective illustrating the manner of mounting a tire in apparatus embodying curing a side wall repair.

Heretofore two methods of tire repair have been in general use. One of these involves the use of sectional mold cavities, usually a fractional part, such as one-fourth or one-fifth, of a circle and into which the tires are seated, the molds being chambered for heating by steam. To press the tires against the mold, either sectional sand or air pressure bags have been employed within the portion of the tire in the cavity. By this method considerable time is required and a large portion of the tire is overcured since the heat necessary to cure the repair travels from the outside of the tire inwardly and affects the already cured rubber about the repair.

The other method involves the use of an internal arm or hollow sectional core heated by steam and over which the repair is mounted, the tire being pressed against the core by the use of muslin strip material wrapped helically about the tire and core and which is tightened up on the core by suitable devices in association therewith. By this method the time required is about the same as for the cavity method and overcuring of a portion of the tire also results.

The present invention contemplates, in general, the use of the internal arm apparatus in connection with a heating device for applying vulcanizing heat to the outside of the tire locally, i. e. only at the point of repair, whereby the repair is vulcanized from both sides in half the time required by former methods and without overcuring the remainder of the tire or any portion thereof.

Referring now to the drawings, 10 indicates a standard form of internal arm or hollow sectional core mounted on a standard 11 and adapted to receive a tire to be repaired thereover. Arranged beneath arm 10 is an arc-shaped bar 12 movable downwardly from the core 10 by means of a screw 13, operable by a hand wheel 14 and adapted to be used to tighten up upon a muslin wrapper indicated at 15 which has been wrapped about the tire, the arm 10 and the bar 12. Steam may be supplied to core or arm 10 by suitable connections as shown.

For vulcanizing a tire mounted on an arm 10 from the outside, a heating device indicated generally at 16 is employed. This device in its preferred form comprises an electrical resistance element 17 seated in a cavity 18 on the back or outer side of a vulcanizing shell 19, preferably of aluminium, shaped to fit the portion of the tire to be repaired, shell 19 in Figures 2 and 3 being shaped to fit the tread and the shell 19 (not visible) in Figure 4 being shaped to fit the side wall of the tire, the shells 19 being made in various shapes and sizes to fit tires of various designs and dimensions and repairs of larger and smaller extent. The resistance element 17 is connected by leads 20, 20 extending through an aperture in a support 21 mounted on the back of a shell 19 to a suitable source of electricity, the ends of the wires adjacent the heating device 16 being protected by a wire coil 22 encircling the same.

The device 16 is arranged to be applied to the tire on an arm such as 10 and to be pressed against the arm by the wrapper 15. To effect a more even distribution of the pressure of the wrapper on the heater 16, to protect the wrapper from the sharp edges of the shell and, moreover, to insulate the heater, an outer covering of suitable material, such as plastic rubber, indicated at 23, is molded about the device 16.

In practicing the method, the injury in the tire is repaired by the building in of repair strips of rubberized fabric or cords on the inside of the tire, and by filling in the tread or side wall portion of the injury with raw rubber in the accepted manner. The tire is then mounted on a steam heated arm 10, preferably raised to the vulcanizing temperature before the application of the tire, with the repair portion resting on the arm. The device 16, also preliminarily heated, and having the rubber covering 23 preliminarily formed thereon, is then applied over the repair as illustrated in Figure 4, a preliminarily formed rubber tread matrix 24 being inserted between the device 16 and the repair when the injury is in the tread portion of the tire as will be understood by skilled artisans.

The muslin wrapper 15 is now wrapped tightly about the device 16, the tire, the arm 10 and bar 12; the latter is drawn downwardly by operation of hand wheel 14; and the repair is then tapped lightly with a rubber mallet to set it. The curing then proceeds for the required time, the heat traveling into the repair from both sides and being confined locally to the repair from the outside so that overcuring of the tread rubber does not result.

Modifications of the invention may be resorted to without departing from the spirit thereof or the scope of the appended claims.

What is claimed is:

1. Apparatus for vulcanizing repairs in tires comprising an inside arm for supporting a tire and adapted to be heated, a device for applying heat locally to the outside of the tire, said device comprising an electrically heated molding and vulcanizing shell, and means for exerting pressure on said shell comprising a wrapper adapted to be helically wound about the arm, tire and local heating device.

2. A local heating device for the outside of a tire comprising a shell shaped to fit the tire and having an electrical heating unit mounted on the outer side thereof and a covering of comparatively soft material over the outer side of the shell and unit whereby the shell may be pressed against a tire by the use of a fabric wrapper.

CLYDE "M" SEMLER.